United States Patent
Takeda et al.

(10) Patent No.: US 11,274,356 B2
(45) Date of Patent: Mar. 15, 2022

(54) STEEL SHEET, HOT-DIP GALVANIZED STEEL SHEET AND GALVANNEALED STEEL SHEET

(71) Applicant: NIPPON STEEL CORPORATION, Tokyo (JP)

(72) Inventors: Kengo Takeda, Tokyo (JP); Kunio Hayashi, Tokyo (JP); Akihiro Uenishi, Tokyo (JP); Hiroyuki Kawata, Tokyo (JP); Chisato Yoshinaga, Tokyo (JP); Yasunobu Miyazaki, Tokyo (JP); Toyomitsu Nakamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 4 days.

(21) Appl. No.: 16/772,692

(22) PCT Filed: Dec. 15, 2017

(86) PCT No.: PCT/JP2017/045065
§ 371 (c)(1),
(2) Date: Jun. 12, 2020

(87) PCT Pub. No.: WO2019/116531
PCT Pub. Date: Jun. 20, 2019

(65) Prior Publication Data
US 2020/0325554 A1 Oct. 15, 2020

(51) Int. Cl.
*C21D 9/46* (2006.01)
*B32B 15/01* (2006.01)
(Continued)

(52) U.S. Cl.
CPC ............ *C21D 9/46* (2013.01); *B32B 15/015* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS 5,203,985 A * 4/1993 Nishimura ................ C23C 2/02
205/193
2004/0234807 A1* 11/2004 Suzuki .................... C23C 28/34
428/659
(Continued)

FOREIGN PATENT DOCUMENTS

CN 103717773 A 4/2014
CN 107109577 A 8/2017
(Continued)

OTHER PUBLICATIONS

International Search Report for PCT/JP2017/045065 (PCT/ISA/210) dated Mar. 20, 2018.
(Continued)

*Primary Examiner* — David Sample
*Assistant Examiner* — Elizabeth Collister
(74) *Attorney, Agent, or Firm* — Birch, Stewart, Kolasch & Birch, LLP (57) ABSTRACT

A steel sheet having a chemical composition of the base metal including, in mass %, C: 0.17 to 0.40%, Si: 0.10 to 2.50%, Mn: 1.00 to 10.00%, P: 0.001 to 0.03%, S: 0.0001 to 0.02%, Al: 0.001 to 2.50%, N: 0.0001 to 0.010%, O: 0.0001 to 0.010%, Ti: 0 to 0.10%, Nb: 0 to 0.10%, V: 0 to 0.10%, B: 0 to 0.010%, Cr: 0 to 2.00%, Ni: 0 to 2.00%, Cu: 0 to 2.00%, Mo: 0 to 2.00%, Ca: 0 to 0.50%, Mg: 0 to 0.50%, REM: 0 to 0.50%, the balance: Fe and impurities, wherein the steel sheet has an internal oxidized layer in which at least one part of a crystal grain boundary is covered by oxides,
(Continued)

and in which a grain boundary coverage ratio of oxides is 60% or more in a region from the surface of the base metal to a depth of 5.0 µm.

19 Claims, 3 Drawing Sheets

(51) Int. Cl.
    *C21D 6/00*         (2006.01)
    *C22C 38/00*      (2006.01)
    *C22C 38/02*      (2006.01)
    *C22C 38/06*      (2006.01)
    *C22C 38/08*      (2006.01)
    *C22C 38/12*      (2006.01)
    *C22C 38/14*      (2006.01)
    *C22C 38/16*      (2006.01)
    *C22C 38/38*      (2006.01)
    *C21D 8/02*       (2006.01)

(52) U.S. Cl.
    CPC ............ *C21D 6/005* (2013.01); *C21D 6/008* (2013.01); *C21D 8/0226* (2013.01); *C21D 8/0263* (2013.01); *C22C 38/002* (2013.01); *C22C 38/005* (2013.01); *C22C 38/02* (2013.01); *C22C 38/06* (2013.01); *C22C 38/08* (2013.01); *C22C 38/12* (2013.01); *C22C 38/14* (2013.01); *C22C 38/16* (2013.01); *C22C 38/38* (2013.01)

(56) References Cited

U.S. PATENT DOCUMENTS

| | | |
|---|---|---|
| 2006/0269776 A1 | 11/2006 | Tanaka et al. |
| 2006/0292391 A1 | 12/2006 | Ikematsu et al. |
| 2010/0304183 A1 | 12/2010 | Honda et al. |
| 2014/0212684 A1 | 7/2014 | Kawata et al. |
| 2014/0234659 A1 | 8/2014 | Kawata et al. |
| 2017/0369965 A1* | 12/2017 | Ikeda .................. C21D 8/0226 |
| 2018/0002799 A1 | 1/2018 | Futamura et al. |
| 2018/0010207 A1* | 1/2018 | Futamura ............... C21D 6/001 |
| 2018/0371570 A1 | 12/2018 | Kim et al. |
| 2019/0024208 A1* | 1/2019 | Kitazawa ................ C22C 38/02 |
| 2020/0325568 A1* | 10/2020 | Jin ............................ C23C 2/40 |

FOREIGN PATENT DOCUMENTS

| | | |
|---|---|---|
| JP | 2004-315960 A | 11/2004 |
| JP | 2004-323970 A | 11/2004 |
| JP | 2005-60742 A | 3/2005 |
| JP | 2006-233333 A | 9/2006 |
| JP | 2006-265671 A | 10/2006 |
| JP | 2008-231493 A | 10/2008 |
| KR | 10-2014-0052070 A | 5/2014 |
| WO | WO 2017/105064 A1 | 6/2017 |

OTHER PUBLICATIONS

Taiwanese Office Action issued in TW Application No. 106144150 dated Oct. 2, 2018.

* cited by examiner

STEEL SHEET, HOT-DIP GALVANIZED STEEL SHEET AND GALVANNEALED STEEL SHEET

TECHNICAL FIELD

The present invention relates to a steel sheet, a hot-dip galvanized steel sheet and a galvannealed steel sheet.

BACKGROUND ART

High strength steel sheets are used as steel sheets for automobiles in order to reduce the weight of the automobiles and increase fuel economy to thereby lower the amount of carbon dioxide gas emissions, and also to ensure the safety of the automobile occupants. In recent years, in addition to high-strength hot-dip galvanized steel sheets, high-strength galvannealed steel sheets are also being used to secure sufficient corrosion resistance for the body and components of automobiles (for example, see Patent Documents 1 to 4).

However, when a hot-dip galvanized steel sheet and a galvannealed steel sheets which have high strength are subjected to spot welding, or a high-strength cold-rolled steel sheet and a galvanized steel sheet are subjected to spot welding in order to assemble the body and/or components of an automobile, cracking that is referred to as "liquid metal embrittlement (LME)" may occur in a spot weld zone. The term "LME (liquid metal embrittlement)" refers to cracking that occurs when zinc of a galvanized layer is melted by heat that arises during spot welding, and molten zinc penetrates into crystal grain boundaries of the steel sheet microstructure at the weld zone, and tensile stress acts in that state.

LME noticeably occurs when high strength TRIP steel sheets (transformation induced plasticity steel sheets) are spot welded. The term "high strength TRIP steel sheet" refers to a steel sheet in which the concentrations of C, Si, and Mn are higher than in a normal high strength steel sheet, and which contains retained austenite, and thus has excellent energy absorption capacity and press formability.

Further, LME generally occurs during spot welding of a high strength steel sheet subjected to galvanization. However, even in the case of a high-strength cold-rolled steel sheet which is not subjected to galvanization, LME may occur due to zinc that melted in a galvanized steel sheet contacting the high-strength cold-rolled steel sheet when performing spot welding to the galvanized steel sheet.

As technology for suppressing liquid metal embrittlement, Patent Document 5 proposes a plated steel sheet whose surface is subjected to galvannealing, that is a high-tensile-strength galvannealed steel sheet which is excellent in workability and liquid metal embrittlement resistance and whose steel substrate has a composition containing C: 0.04 to 0.25 mass %, Si: 0.01 to 2.0 mass %, Mn: 0.5 to 3.0 mass %, P: 0.1 mass % or less, S: 0.03 mass % or less, and one or more types of element selected from Ti: 0.001 to 0.1 mass %, Nb: 0.001 to 0.1 mass %, V: 0.01 to 0.3 mass %, Mo: 0.01 to 0.5 mass % and Zr: 0.01 to 0.5 mass %, with the balance being Fe and unavoidable impurities, and has a metal micro-structure consisting of a ferrite phase with an area fraction of 40 to 95%, one or more types of phase among a bainite phase, a pearlite phase, and a martensite phase, and a retained austenite phase with a volume ratio of 1 to 10%.

Further, in Patent Document 6, a method for producing a galvannealed steel sheet for spot welding is proposed in which a steel substrate containing, by mass %, C: 0.05 to 0.20%, Si: 0.5 to 2.0% and Mn: 1.0 to 2.5%, with the balance being Fe and unavoidable impurities is hot-rolled, and after hot rolling is cooled at a cooling rate of 30° C./sec or more and is coiled at a temperature within a range of 450 to 580° C. to thereby make the intergranular oxidation depth of the hot-rolled steel sheet 5 μm or less, which is followed by subjecting the hot-rolled steel sheet to cold rolling, performing an Fe electroplating process on the cold-rolled steel sheet so that the coating mass becomes 3 g/m$^2$ or more, and performing a galvannealing process on the cold-rolled steel sheet to make the intergranular oxidation depth of the galvannealed steel sheet 5 μm or less.

LIST OF PRIOR ART DOCUMENTS

Patent Documents

Patent Document 1: JP2005-060742A
Patent Document 2: JP2004-323970A
Patent Document 3: JP2006-233333A
Patent Document 4: JP2004-315960A
Patent Document 5: JP2006-265671A
Patent Document 6: JP2008-231493A

SUMMARY OF INVENTION

Technical Problem

The steel sheet disclosed in Patent Document 5 is a steel sheet in which austenite that is formed during spot welding is refined by a pinning effect of precipitates and/or composite precipitates of additional elements, making a complex route for diffusing and penetrating molten zinc to thereby suppress penetration of the molten zinc. However, only making a complex route for diffusing and penetrating molten zinc is not necessarily sufficient for enhancing the liquid metal embrittlement resistance.

Further, when the amount of additional elements that form composite precipitates that act to exert a pinning effect is increased, the strength and liquid metal embrittlement resistance are enhanced. However, on the other hand, because the ductility and toughness decrease, it is difficult to apply the steel sheet of Patent Document 5 as a steel sheet for automobiles, which is required to undergo complex and severe working processes.

A steel sheet produced by the method disclosed in Patent Document 6 can suppress the occurrence of liquid metal embrittlement even in a case where spot welding is performed under conditions of a large current and a large heat input in which expulsion occurs, by making the intergranular oxidation depth 5 μm or less. However, if a region with a large amount of residual stress after working is spot welded, molten zinc is liable to penetrate into crystal grain boundaries of the weld zone and liquid metal embrittlement is liable to occur.

An objective of the present invention is to provide a steel sheet, a hot-dip galvanized steel sheet and a galvannealed steel sheet which are excellent in liquid metal embrittlement resistance.

Solution to Problem

The present invention has been made to solve the problems described above, and the gist of the present invention is a steel sheet, a hot-dip galvanized steel sheet and a galvannealed steel sheet which are described hereunder.

(1) A steel sheet in which a chemical composition of a base metal comprises, in mass %,
C: 0.17 to 0.40%,
Si: 0.10 to 2.50%,
Mn: 1.00 to 10.00%,
P: 0.001 to 0.03%,
S: 0.0001 to 0.02%,
Al: 0.001 to 2.50%,
N: 0.0001 to 0.010%,
O: 0.0001 to 0.010%,
Ti: 0 to 0.10%,
Nb: 0 to 0.10%,
V: 0 to 0.10%,
B: 0 to 0.010%,
Cr: 0 to 2.00%,
Ni: 0 to 2.00%,
Cu: 0 to 2.00%,
Mo: 0 to 2.00%,
Ca: 0 to 0.50%,
Mg: 0 to 0.50%,
REM: 0 to 0.50%, and
the balance: Fe and impurities,
wherein the steel sheet has, from a surface of the base metal to a depth of 5.0 µm or more, an internal oxidized layer in which at least one part of a crystal grain boundary is covered with oxides, and wherein:
in a region from the surface of the base metal to a depth of 5.0 µm, a grain boundary coverage ratio of the oxides is 60% or more.

(2) The steel sheet according to (1) above, having:
a decarburization layer from the surface of the base metal to a depth of 50 µm or more.

(3) The steel sheet according to (1) or (2) above, having:
a nickel electroplating layer on the surface of the base metal.

(4) The steel sheet according to any one of (1) to (3) above, wherein the steel sheet has a tensile strength of 980 MPa or more.

(5) A hot-dip galvanized steel sheet, having:
a hot-dip galvanized layer on a surface of the steel sheet according to any one of (1) to (4) above.

(6) The hot-dip galvanized steel sheet according to (5) above, wherein:
a coating mass of the hot-dip galvanized layer is not more than 70 g/m$^2$.

(7) A galvannealed steel sheet, having:
a galvannealed layer on a surface of the steel sheet according to any one of (1) to (4) above.

(8) The galvannealed steel sheet according to (7) above, wherein:
a coating mass of the galvannealed layer is not more than 70 g/m$^2$.

(9) The galvannealed steel sheet according to (7) or (8) above, wherein:
the galvannealed layer contains, in mass %, Fe: 7.0 to 15.0%.

Advantageous Effects of Invention

According to the present invention, a steel sheet, a hot-dip galvanized steel sheet and a galvannealed steel sheet which are excellent in liquid metal embrittlement resistance can be obtained.

DESCRIPTION OF EMBODIMENTS

Figure 1:
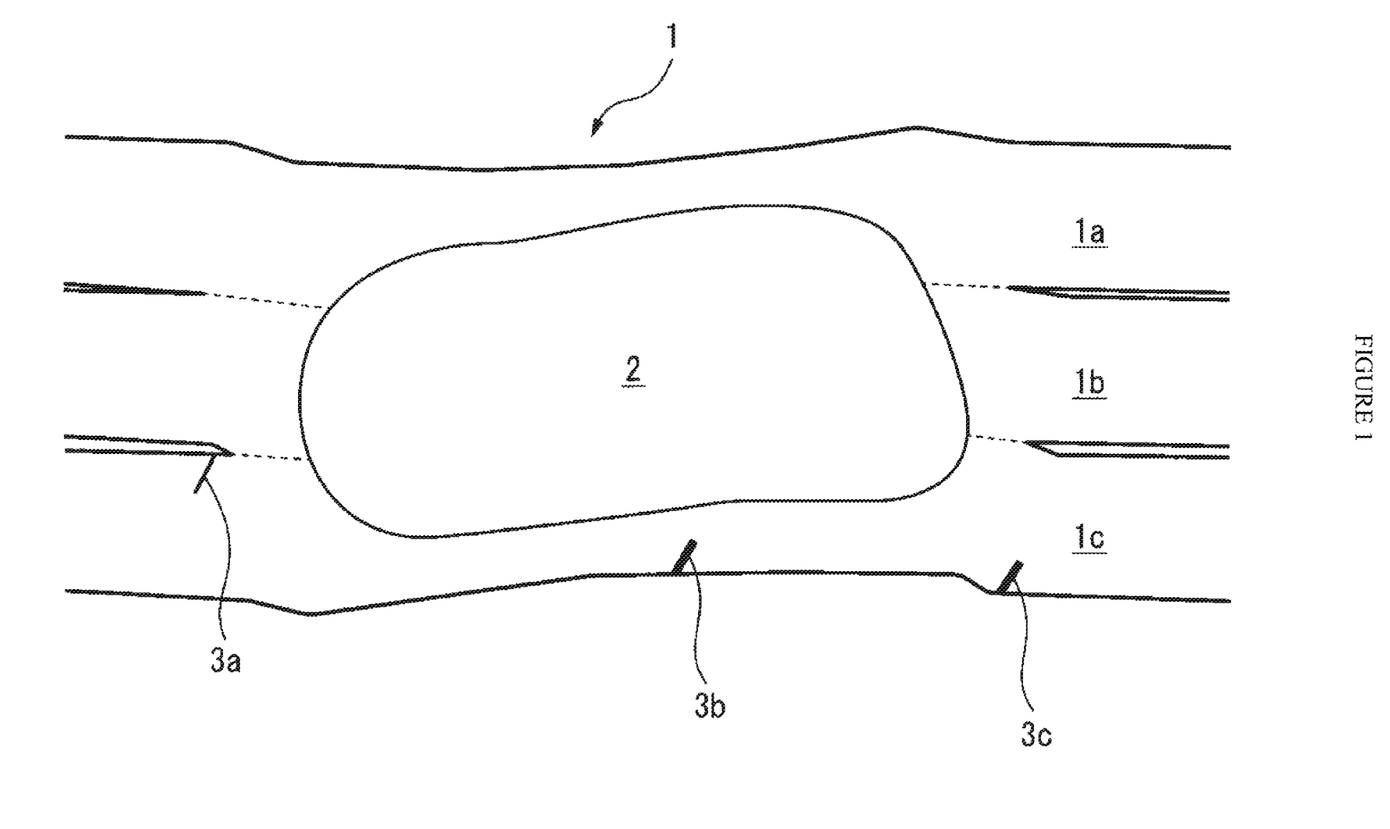
FIG. 1 is a view which schematically illustrates the appearance of LME that occurred in a weld zone.

In FIG. 1, the appearance of LME that occurred in a weld zone is schematically illustrated. By placing a steel sheet 1a, a steel sheet 1b and a steel sheet 1c on top of each other and performing spot welding to form a nugget 2, the three steel sheets can be joined together. At such time, as illustrated in FIG. 1, in some cases an inner crack 3a between steel sheets, an outer crack 3b at a contact portion between a steel sheet and a spot welding electrode, and an outer crack 3c at a steel sheet portion that does not directly contact the electrode may arise.

As described above, LME occurs due to stress that arises around a weld zone during welding when zinc of a plating layer that melted due to heat that arose during welding penetrates into crystal grain boundaries of the weld zone micro-structure and the grain boundaries are embrittled. LME can occur not only in a case in which three steel sheets are placed on top of each other and welded as illustrate in FIG. 1, but also in a case where two steel sheets or four steel sheets are placed on top of each other and spot welded.

The present inventors focused their attention on the state of the outer layer of steel sheets and conducted concentrated studies regarding methods for suppressing the occurrence of LME that is caused by molten metal (in particular, molten zinc), and obtained the following findings.

If a heat treatment is performed under prescribed conditions on a steel sheet in which easily oxidizable elements such as Si and Mn are contained in the base metal, in some cases oxides containing easily oxidizable elements are formed at crystal grain boundaries inside the steel sheet, and not at the surface of the steel sheet.

As a result of performing spot welding on various kinds of steel sheets, it has been found that in the case of a steel sheet in which the aforementioned internal oxides are formed, there is a tendency for the occurrence of LME to be suppressed. It is considered that penetration of molten zinc during welding is suppressed because crystal grain boundaries in the outer layer of the base metal are covered beforehand by the internal oxides.

Therefore, the present inventors conducted further investigations and discovered that in order to suppress the occurrence of LME it is important to cause a layer in which the aforementioned internal oxidation occurs (hereunder, referred to as "internal oxidized layer") to be present to a predetermined depth, and also to increase the coverage ratio of crystal grain boundaries by oxides (hereunder, referred to as "grain boundary coverage ratio").

Further, as the result of conducting studies regarding methods for producing a steel sheet that satisfies the aforementioned conditions, the present inventors found that it is important to control the heat treatment conditions at the time of forming an internal oxidized layer.

Oxides that arise in the outer layer of a steel sheet during annealing are divided into the morphology of external oxidation and morphology of internal oxidation depending on the oxygen potential in the annealing atmosphere. This change in morphology is determined by competition between a flux caused by diffusion of easily oxidizable elements from the center of the sheet thickness to the surface of the steel sheet and a flux caused by diffusion of oxygen from the surface to the center of the sheet thickness of the steel sheet.

When the oxygen potential in the atmosphere is low, or when the dew point is low, the flow rate of diffusion of oxygen to inside of the steel sheet is low, and the flow rate of diffusion of relatively easily oxidizable elements to the steel sheet surface is high, and therefore external oxides are formed.

Accordingly, it is necessary to cause internal oxides to be formed in order to cover the crystal grain boundaries with oxides, and it is essential to increase the oxygen potential in the atmosphere during annealing or to raise the dew point.

Note that, it has been also revealed that grain boundaries cannot be sufficiently covered with internal oxides by only controlling the atmosphere during a heat treatment. Therefore, the present inventors conducted studies regarding a method for efficiently causing grain boundaries to be covered by internal oxides.

As a result, the present inventors discovered that when a heat treatment is performed in a state in which the heat treatment temperature is set to a high temperature and tensile stress is applied to the steel sheet to cause crystal lattices to expand, it is possible to cause oxygen to efficiently dissolve in lattices within grains of the outer layer of the steel sheet, and the coverage ratio of internal oxides to the grain boundaries also increases.

In addition, to increase the coverage ratio of internal oxides to the grain boundaries, it is not required to make the aforementioned tensile stress constant, but rather it is necessary to alternately apply strong stress and weak stress.

Figure 2:
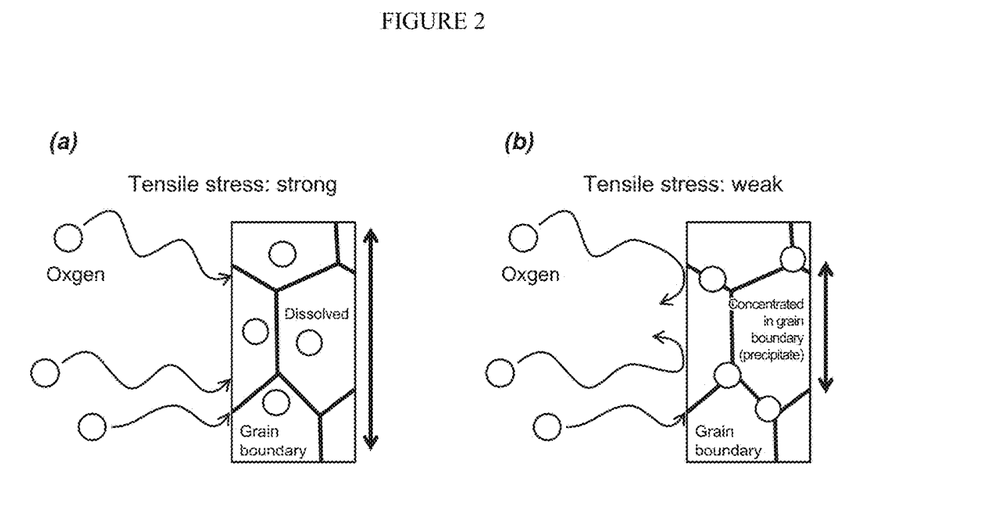
FIG. 2 is a view which schematically illustrates that a solid solution state of oxygen inside a steel sheet changes due to a change in tensile stress during heat treatment. In the figure, (a) illustrates a solid solution state of oxygen in a case where strong tensile stress is applied, and (b) illustrates a solid solution state of oxygen in a case where weak tensile stress is applied.

As illustrated in FIG. 2(a), in a state in which strong tensile stress is applied, oxygen dissolves at grain boundaries of crystals and within grains. Thereafter, as illustrated in FIG. 2(b), when the tensile stress becomes weak, because the crystal lattice narrows, the oxygen dissolved inside the grains moves to the grain boundaries, and stabilizes there and is present as precipitate. Thereafter, when strong stress is applied once more, new oxygen from outside dissolves inside the grains. By repeating this process, the oxides precipitating at the crystal grain boundaries increase, and the grain boundary coverage ratio increases.

The present invention has been made based on the findings described above. The respective requirements of the present invention are described in detail hereunder.

(A) Chemical Composition of Base Metal

The reasons for limiting each element are as follows. Note that, the symbol "%" with respect to content in the following description means "mass %".

C: 0.17 to 0.40%

Carbon (C) is an element that is necessary for enhancing the steel sheet strength. When the content of C is less than 0.17%, retained austenite cannot be sufficiently obtained and it is difficult to obtain both high strength and high ductility in a compatible manner. On the other hand, when the content of C is more than 0.40%, weldability decreases noticeably. Therefore, the content of C is set within the range of 0.17 to 0.40%. The content of C is preferably 0.20% or more, and preferably is not more than 0.35%.

Si: 0.10 to 2.50%

Silicon (Si) is an element that contributes to enhancing the steel sheet strength by suppressing temper-softening of martensite, in addition to solid-solution strengthening. Further, in a steel sheet for which workability is improved by transformation induced plasticity (TRIP effect) of retained austenite, Si is an important element for suppressing precipitation of iron-based carbides in austenite and securing the retained austenite volume ratio in the steel sheet microstructure.

When the content of Si is less than 0.10%, the hardness of tempered martensite significantly decreases, and retained austenite cannot be sufficiently obtained, and the workability is insufficient. On the other hand, when the content of Si is more than 2.50%, the steel sheet becomes brittle and the ductility decreases, and plating properties also decrease and non-plating is liable to occur. Therefore, the content of Si is set within the range of 0.10 to 2.50%. The content of Si is preferably 0.50% or more, and preferably is not more than 2.00%.

Mn: 1.00 to 10.00%

Manganese (Mn) is an element that increases hardenability and contributes to enhancing the steel sheet strength. When the content of Mn is less than 1.00%, a soft microstructure is formed during cooling after annealing, and it is difficult to secure strength. On the other hand, when the content of Mn is more than 10.00%, due to selective oxidation during reduction annealing, the plating properties decrease and the workability and weldability also decrease. Therefore, the content of Mn is set within the range of 1.00 to 10.00%. The content of Mn is preferably 1.30% or more, and from the viewpoint of weldability is preferably 5.00% or less.

P: 0.001 to 0.03%

Phosphorus (P) is an element that has an action that increases the steel sheet strength and suppresses penetration of molten zinc into the steel sheet micro-structure. When the content of P is less than 0.001%, the aforementioned effect is not sufficiently obtained. On the other hand, when the content of P is more than 0.03%, the steel sheet is embrittled by segregation of P to the crystal grain boundaries. Accordingly, the content of P is set within the range of 0.001 to 0.03%. The content of P is preferably 0.005% or more, and preferably is not more than 0.02%.

S: 0.0001 to 0.02%

Sulfur (S) is an element that is a cause of hot brittleness, and also hinders weldability and corrosion resistance. Because making the content of S less than 0.0001% may entail a significant increase in the production cost, the content of S is substantially 0.0001% or more. On the other hand, when the content of S is more than 0.02%, hot workability, weldability and corrosion resistance noticeably decrease. Therefore, the content of S is set within the range of 0.0001 to 0.02%. The content of S is preferably 0.0010% or more, and preferably is not more than 0.01%.

Al: 0.001 to 2.50%

Aluminum (Al) is a deoxidizing element, and is an element that suppresses formation of iron-based carbides and contributes to enhancement of strength. When the content of Al is less than 0.001%, a deoxidation effect is not sufficiently obtained. On the other hand, when the content of Al is more than 2.50%, a ferrite fraction increases and the strength decreases. Therefore, the content of Al is set within the range of 0.001 to 2.50%. The content of Al is preferably 0.005% or more, and preferably is not more than 2.00%.

N: 0.0001 to 0.010%

Nitrogen (N) is an element that forms nitrides and inhibits stretch flangeability, and is also a cause of blowhole occurrence during welding. Because making the content of N less than 0.0001% may entail a significant increase in the production cost, the content of N is substantially 0.0001% or more. On the other hand, when the content of N is more than 0.010%, stretch flangeability noticeably decreases, and blowholes also occur during welding. Therefore, the content of N is set within the range of 0.0001 to 0.010%. Although the content of N is preferably as small as possible, from the viewpoint of production cost the content of N is preferably 0.0010% or more. Further, the content of N is preferably not more than 0.008%.

O: 0.0001 to 0.010%

Oxygen (O) is an element that forms oxides and inhibits stretch flangeability. Because making the content of O less than 0.0001% may entail a significant increase in the production cost, the content of O is substantially 0.0001% or more. On the other hand, when the content of O is more than 0.010%, stretch flangeability noticeably decreases. Therefore, the content of O is set within the range of 0.0001 to 0.010%. Although the content of O is preferably as small as possible, from the viewpoint of production cost the content of O is preferably 0.0010% or more. Further, the content of O is preferably not more than 0.007%.

Ti: 0 to 0.10%

Nb: 0 to 0.10%

V: 0 to 0.10%

Titanium (Ti), niobium (Nb) and vanadium (V) are elements that contribute to enhancing the strength of the steel sheet by precipitation strengthening, fine-grain strengthening by suppressing growth of grains, and dislocation strengthening through suppression of recrystallization. Therefore, one or more types of element selected from these elements may be contained as necessary.

However, if the content of any of these elements is more than 0.10%, coarse carbo-nitrides may precipitate and the formability may decrease. Therefore, the content of each of Ti, Nb and V is made not more than 0.10%. Note that, when it is desired to obtain the aforementioned effect, the content of one or more types of element selected from Ti, Nb and V is preferably 0.005% or more, and more preferably is 0.010% or more.

B: 0 to 0.010%

Boron (B) is an element that segregates at austenite grain boundaries during welding and strengthens the crystal grain boundaries, and thereby contributes to enhancement of liquid metal embrittlement resistance. Therefore, B may be contained as necessary. However, when the content of B is more than 0.010%, carbides and nitrides are formed and the aforementioned effect is saturated, and hot workability decreases. Therefore, the content of B is made not more than 0.010%. The content of B is preferably not more than 0.005%. Note that, when it is desired to obtain the aforementioned effect, the content of B is preferably 0.0005% or more, and more preferably is 0.0008% or more.

Cr: 0 to 2.00%

Ni: 0 to 2.00%

Cu: 0 to 2.00%

Chrome (Cr), nickel (Ni) and copper (Cu) are elements that contribute to enhancing strength. Therefore, one or more types of element selected from these elements may be contained as necessary.

However, if the content of any of these elements is more than 2.00%, pickling properties, weldability and hot workability decrease. Therefore, the content of each of Cr, Ni and Cu is made not more than 2.00%. The content of each of these elements is preferably not more than 1.50%. Note that, when it is desired to obtain the aforementioned effect, preferably the content of one or more types of element selected from Cr, Ni and Cu is 0.01% or more, and more preferably is 0.10% or more.

Mo: 0 to 2.00%

Similarly to Mn and Ni, molybdenum (Mo) is an element that increases the hardenability of the steel and contributes to improving the strength. Therefore, Mo may be contained as necessary. However, if the content of Mo is more than 2.00%, hot workability decreases and productivity decreases. Therefore, the content of Mo is made not more than 2.00%. The content of Mo is preferably not more than 1.50%. Note that, when it is desired to obtain the aforementioned effect, the content of Mo is preferably 0.01% or more, and more preferably is 0.10% or more.

Ca: 0 to 0.50%

Mg: 0 to 0.50%

REM: 0 to 0.50%

Calcium (Ca), magnesium (Mg) and rare earth metals (REM) are elements that contribute to enhancing formability. Therefore, one or more types of element selected from these elements may be contained as necessary.

However, if the content of any of these elements is more than 0.50%, the pickling properties, weldability and hot workability may decrease. Therefore, the content of each of Ca, Mg and REM is made not more than 0.50%. The content of each of these elements is preferably not more than 0.35%. Note that, when it is desired to obtain the aforementioned effect, the content of one or more types of element selected from Ca, Mg and REM is preferably 0.0001% or more, and more preferably is 0.0010% or more.

Further, in the case of containing a combination of Ca, Mg and REM, the total content of these elements is preferably not more than 0.50%, and more preferably is not more than 0.35%.

In the present invention, the term "REM" refers to a total of 17 elements that are Sc, Y and the lanthanoids, and the aforementioned content of REM means the total content of these elements. Note that, in industrial use the lanthanoids are added in the form of misch metal.

In the chemical composition of the steel sheet of the present invention, the balance is Fe and impurities.

Here, the term "impurities" refers to components which, during industrial production of the steel sheet, are mixed in from raw material such as ore or scrap or due to various factors in the production process, and which are allowed within a range that does not adversely affect the present invention.

(B) Internal Oxidized Layer

The steel sheet according to the present invention has an internal oxidized layer from the surface of the base metal to a depth of 5.0 μm or more. The term "internal oxidized layer" refers to a layer in which at least one part of crystal grain boundaries of the base metal is covered by oxides of easily oxidizable elements such as Si, Mn and so on. When the crystal grain boundaries are covered by oxides, it is possible to inhibit penetration of molten metal into the crystal grain boundaries during welding, and also to suppress the occurrence of LME cracking during welding.

Further, when easily oxidizable elements such as Si, Mn and so on are present at crystal grain boundaries as oxides, the concentration of oxides at the surface of the base metal is suppressed. Oxides formed on the base metal surface lower the wettability of the hot-dipping metal and are also a cause of non-plating. Therefore, by forming an internal oxidized layer, the occurrence of non-plating can be prevented and plating properties can be improved.

Further, it is necessary for the grain boundary coverage ratio of the oxides to be 60% or more in a region from the surface of the base metal to a depth of 5.0 µm. The grain boundary coverage ratio is the proportion (%) of the length of crystal grain boundaries covered by oxides with respect to the overall length of crystal grain boundaries in the aforementioned region. If the depth to which the internal oxidized layer is present is less than 5.0 µm or the grain boundary coverage ratio is less than 60%, an effect of improving the liquid metal embrittlement resistance of the steel sheet is not obtained.

The depth to which the internal oxidized layer is present is preferably 5.5 µm or more, and more preferably is 6.0 µm or more. Further, the grain boundary coverage ratio is preferably 70% or more, and more preferably is 80% or more. Note that, although a grain boundary coverage ratio of 100% is most preferable, realizing a grain boundary coverage ratio of 100% would require a great deal of production condition constraints, and would lead to a significant increase in production costs. Therefore, the upper limit is set as less than 100%.

Figure 3:
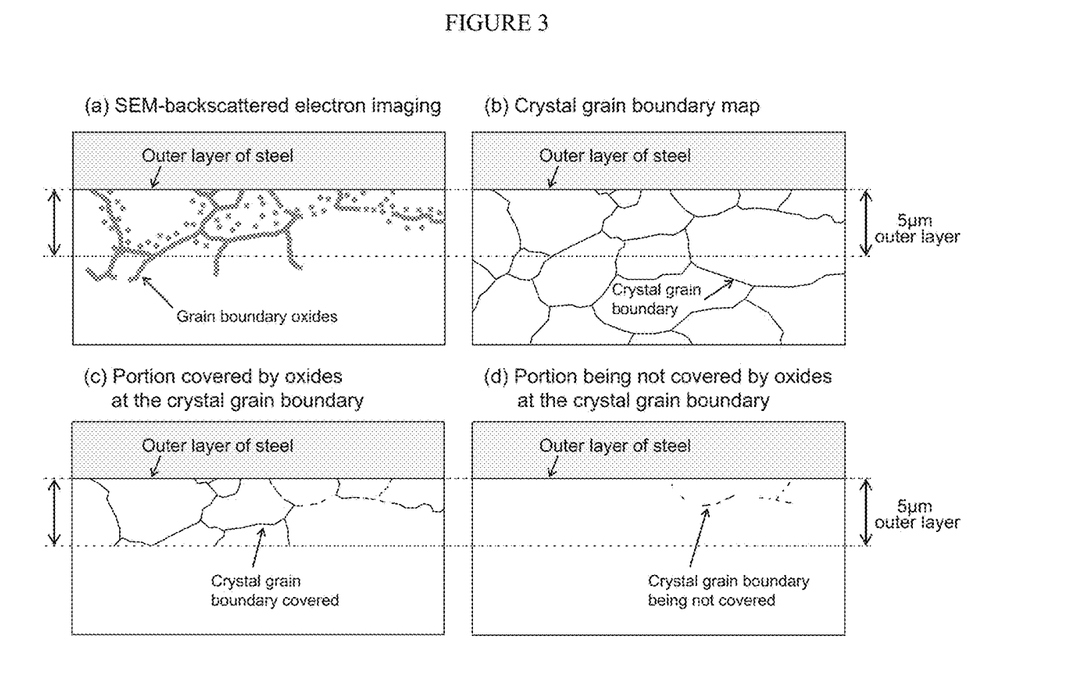
FIG. 3 is a schematic diagram for describing a process for calculating a grain boundary coverage ratio. In the figure, (a) illustrates grain boundary oxides of an outer layer of steel imaged by SEM-backscattered electron imaging, and (b) illustrates a crystal grain boundary map in which crystal orientation differences of 15° or more are present at the same positions. Further, (c) illustrates a portion covered by oxides at the crystal grain boundary, and (d) illustrates a portion that is not covered by oxides.

In the present invention, the depth to which the internal oxidized layer is present and the grain boundary coverage ratio are determined by the following method as illustrated in FIG. 3. Crystal orientation analysis (SEM-EBSD) based on scanning electron microscopy (SEM) and backscattered electrons is used to observe the micro-structure. First, a sample to be used for micro-structure observation is taken from the steel sheet so as to enable observation of the micro-structure at a sheet-thickness cross section.

In the obtained sample, a face that is parallel to the rolling direction and perpendicular to the sheet thickness direction is subjected to wet polishing using emery paper, and is further subjected to buff polishing using diamond abrasive grains having an average diameter of 1 µm to thereby finish the observation surface to be a mirror-like surface. Next, to remove strain introduced into the polished surface by the aforementioned mechanical polishing, colloidal silica polishing is performed using a suspension in which alcohol is adopted as a solvent.

Note that, in the colloidal silica polishing, since further strain may be introduced if the applied load increases during polishing, it is important to suppress the load during polishing. Therefore, for the polishing using colloidal silica, automatic polishing may be performed using VibroMet 2 manufactured by Buehler for one hour with an output setting of 40%.

However, if electropolishing or chemical etching or the like is applied in the process of removing the strain introduced by mechanical polishing, oxides may dissolve, and consequently it may not be possible to ascertain the actual state of oxides that are present on grain boundaries in the observation. Further, similar care is also necessary in the case of performing polishing in which water is adopted as a solvent, because water-soluble oxides may dissolve in the course of polishing in which water is adopted as a solvent, and observation of internal oxides on the grain boundaries may not be possible. Therefore, in the polishing and finishing process, it may be necessary to adopt a process that is not included in the aforementioned procedure.

The outer layer of the sample adjusted by the procedure described above is observed by SEM and SEM-EBSD. Among observation magnifications within the range of 1000 to 9000 times, a magnification at which the number of ferrite grains included in the micro-structure is 10 or more is selected, for example, the magnification is set to 3000 times.

First, as illustrated in FIG. 3(a), oxides that are present at grain boundaries are confirmed in a backscattered electron image obtained by SEM. In the backscattered electron image, oxides and the iron and steel micro-structure can be easily distinguished because the color tone changes depending on the atomic number (or mass).

Further, with respect to observation of the micro-structure in the backscattered electron image, in a case where, for example, a state in which an atomic number (or mass) is small is set so as to be displayed in a "black color tone", oxides having a small mass relative to iron may be displayed in a black color tone in the observation image (see FIG. 3(a)). The micro-structure of the outer layer of the steel sheet in five visual fields is imaged under this observation condition, and the state with respect to the presence of internal oxides is ascertained in advance.

Subsequently, crystal orientation data for bcc iron is acquired by SEM-EBSD at the same positions as the visual fields observed by means of the aforementioned SEM-backscattered electron image. An arbitrary magnitude within the range of 1000 to 9000 times is selected as the magnitude for measurement, and for example the same magnitude as the magnitude for observation of the aforementioned SEM-backscattered electron image may be selected. Further, a magnification within the range of 0.01 to 0.1 µm is adopted as the measurement step, and 0.05 µm may be selected.

In the crystal orientation map data for bcc iron obtained under the aforementioned measurement conditions, boundaries at which the crystal orientation difference is 15° or more are taken as crystal grain boundaries, except for regions for which the confidence index value (CI value) is less than 0.1. Note that, the term "CI value" refers to a numerical value that serves as an index of reliability in a crystal orientation determination that is displayed by analysis software, and in general the reliability is considered to be low when the value thereof is less than 0.1.

Since crystal orientation data for bcc iron is not obtained in a case where oxides are present at grain boundaries of ferrite, there may be many regions for which the CI value is less than 0.1 between adjacent grains. In this case, although a crystal grain boundary cannot be distinctly confirmed, at a boundary at which the orientation difference with an adjacent ferrite grain is 15° or more, a crystal grain boundary is plotted on the map so as to pass through the center of the regions for which the CI value is less than 0.1.

In the ferrite grain boundary map (see FIG. 3(b)) obtained by the above procedure, the length of crystal grain boundaries covered by oxides (hereunder, referred to as "oxide covered length") is measured, as illustrated in FIG. 3(c). Next, as illustrated in FIG. 3(d), the length of crystal grain boundaries that are not covered by oxides (hereunder, referred to as "oxide non-covered length") is measured. The grain boundary coverage ratio (%) is then calculated by dividing the obtained oxide covered length by the length of all of the crystal grain boundaries.

(C) Decarburization Layer

The steel sheet according to the present invention preferably has a decarburization layer from the surface of the base metal to a depth of 50 μm or more. The term "decarburization layer" refers to a carbon-depleted layer that is present in the vicinity of the surface of the base metal. In a decarburization layer, the hardness decreases accompanying a decrease in the content of carbon. In the present invention, in the outer layer of the base metal, a region of the outer layer in which the hardness is 80% or less relative to the average hardness of a region of ⅖ to ⅗ of the sheet thickness is defined as a decarburization layer.

As described above, LME is liable to occur when tensile stress acts in a state in which molten metal has penetrated into crystal grain boundaries in a weld zone. If a soft decarburization layer is present in the outer layer of the base metal, stress decreases and it becomes difficult for cracks to occur. Therefore, preferably a decarburization layer is present to a depth of 50 μm or more from the surface of the base metal.

Preferably the depth to which the decarburization layer is present is more than 80 μm, and more preferably is 100 μm or more. Although an upper limit is not particularly defined, if the depth is more than 150 μm, an effect of suppressing the occurrence of LME is saturated, and on the contrary the ultimate tensile strength (=tensile strength) decreases, and it also leads to a decrease in the withstand load during bending deformation. Therefore, the depth to which the decarburization layer is present is preferably not more than 150 μm.

(D) Tensile Strength

As described above, it is desirable for the steel sheet according to the present invention to have high strength in the case of using the steel sheet as a steel sheet for automobiles. Although limitations are not particularly set with respect to the mechanical properties, the tensile strength is preferably 980 MPa or more, more preferably is 1050 MPa or more, and further preferably is 1100 MPa or more. Note that, if the tensile strength is more than 2000 MPa, the residual stress during welding may increase, and consequently internal oxidized layers on grain boundaries may be cracked and the effect of suppressing LME cracking may noticeably decrease. Therefore, preferably 2000 MPa is adopted as the upper limit of the tensile strength.

(E) Plating Layer

The steel sheet according to the present invention may have a hot-dip galvanized layer on the surface. The corrosion resistance is improved by providing a hot-dip galvanized layer on the steel sheet surface.

Further, the hot-dip galvanized layer may be subjected to alloying. Because Fe is incorporated into the hot-dip galvanized layer by the alloying treatment, excellent weldability and coating properties are obtained in the galvannealed layer.

Limitations are not particularly set with respect to the coating mass of the hot-dip galvanized layer or galvannealed layer. However, if the coating mass is too large, the molten zinc amount during welding may increase. Therefore, from the viewpoint of more effectively suppressing the occurrence of LME, each coating mass is preferably not more than 70 g/m², and more preferably is not more than 60 g/m².

In addition, in a case where the surface has a galvannealed layer, the higher that the Fe concentration in the plating layer is, the easier it may be for an alloying reaction to proceed during spot welding, and the greater the degree to which the molten zinc amount that is present during welding can be decreased. Therefore, the Fe concentration of the galvannealed layer is preferably 7.0 mass % or more, and more preferably is 9.0 mass % or more.

On the other hand, if the Fe concentration in the galvannealed layer is more than 15.0 mass %, in the alloyed layer of the hot-dip galvanized layer, the proportion of a Γ phase that is an intermetallic compound that is poor in workability may increase, and there is a risk that cracking of the plating layer may occur during press forming, and due to the so-called "powdering phenomenon", a phenomenon may occur in which the plating peels off due to plastic deformation during press forming. Therefore, the Fe concentration of the galvannealed layer is preferably not more than 15.0 mass %, and more preferably is not more than 13.0 mass %.

(F) Nickel Electroplating Layer

The steel sheet of the present invention may have a nickel electroplating layer on the surface of the base metal. If a nickel electroplating layer is present, zinc and nickel are fused during spot welding, and the solidification temperature of the molten zinc rises. As a result, the molten zinc solidifies before penetrating into crystal grain boundaries, and hence the occurrence of LME is effectively suppressed.

(G) Production Method

The steel sheet according to the present invention can be produced, for example, by subjecting a hot-rolled steel sheet or a cold-rolled steel sheet to annealing under prescribed conditions.

The conditions for producing the hot-rolled steel sheet or cold-rolled steel sheet are not particularly limited. For example, the hot-rolled steel sheet can be produced by casting molten steel having the chemical composition described above under normal conditions to form a slab, and thereafter performing hot rolling under normal conditions.

Note that, the slab after casting may be cooled once to a temperature of 500° C. or less, and thereafter reheated and subjected to hot rolling. However, if the slab is held for an extended period in a temperature range of 500 to 800° C., an oxide film of easily oxidizable elements may grow on the surface of the slab. As a result, in the outer layer of the base metal, the content of easily oxidizable elements may decrease, and thereafter it may be difficult for an internal oxidized layer to form. Therefore, after casting it is preferable to reheat the slab to a predetermined temperature and perform hot rolling before the surface temperature of the slab falls to 800° C. or less.

Further, a cold-rolled steel sheet can be produced by subjecting the aforementioned hot-rolled steel sheet to cold rolling under normal conditions.

Next, annealing conditions for forming an internal oxidized layer are described in detail. Note that, annealing can be performed, for example, using a continuous annealing line.

<Annealing Atmosphere>

To prevent diffusion of easily oxidizable elements to the steel sheet surface and to promote internal oxidation, it is important to control the oxygen potential in the heating zone during annealing. Specifically, annealing is preferably performed in an atmosphere containing 0.1 to 30 vol % of hydrogen and $H_2O$ with a dew point in the range of −40 to 20° C., and with the balance being nitrogen and impurities. More preferably, annealing is performed in an atmosphere containing 0.5 to 20 vol % of hydrogen and $H_2O$ with a dew point in the range of −30 to 15° C., and further preferably is performed in an atmosphere containing 1 to 10 vol % of hydrogen and $H_2O$ with a dew point in the range of −20 to 10° C.

Note that, an annealing furnace broadly divided into three regions, namely, a preheating zone, a heating zone, and a holding zone. For the steel sheet according to the present invention, the atmosphere in the heating zone is made an atmosphere in accordance with the aforementioned conditions. Atmosphere control is also possible in the preheating zone and holding zone. However, the ambient temperature in the preheating zone is low, and the flux of diffusion of oxygen and easily oxidizable elements decreases noticeably. Further, the holding temperature in the holding zone is high, and the flux of diffusion of oxygen and easily oxidizable elements decreases noticeably due to formation of austenite in the micro-structure. In other words, the influence that atmosphere control in the preheating zone and holding zone has on the grain boundary coverage ratio of an internal oxidized layer is small.

<Annealing Temperature>

In order to cause oxygen to efficiently dissolve inside the steel sheet during annealing, it is necessary to make the annealing temperature more than 750° C. and not more than 900° C. The reason is that if the annealing temperature is 750° C. or less, there is a risk that an internal oxidized layer may not be sufficiently formed. On the other hand, if the annealing temperature is more than 900° C., it may lead to sheet ruptures, excessive decarburization and the formation of surface defects in the sheet passing process. The annealing temperature is preferably 780° C. or more, and is preferably not more than 840° C.

<Tensile Stress>

In order to cause oxygen to efficiently dissolve inside the steel sheet, a tensile stress within the range of 3 to 150 MPa is applied to the steel sheet in a region of 300° C. or more in the heating zone during annealing. If the minimum tensile stress that is applied is less than 3 MPa, turning-up of the steel sheet may occur and the producibility may decrease. Further, if the maximum tensile stress that is applied is less than 3 MPa, an effect that widens the crystal lattice and makes it easy to dissolve oxygen may not be sufficiently obtained. Note that, from the viewpoint of increasing the grain boundary coverage ratio of oxides in the internal oxidized layer, the maximum tensile stress is preferably 15 MPa or more. On the other hand, if the maximum tensile stress is more than 150 MPa, it may lead to swaging and rupturing of the sheet in the sheet passing process.

Further, as described above, in order to increase the coverage ratio of oxides to the grain boundaries, the tensile stress is not made constant, but rather a strong stress and a weak stress are alternately applied. This is because oxygen in lattices within grains dissolves when strong stress is applied, and subsequently when the applied stress is weakened, the oxygen that dissolved inside the lattices diffuses toward the grain boundaries (see FIG. 2), and forms precipitates (oxides) on the grain boundaries.

In order to satisfy a condition of a grain boundary coverage ratio of 60% or more that is defined for the steel sheet of the present invention, a difference between the maximum tensile stress and the minimum tensile stress (hereunder, referred to as "maximum-minimum stress difference") is preferably 2 MPa or more, and more preferably is 4 MPa or more. In addition, in order to satisfy a condition of a grain boundary coverage ratio of 80% or more, the maximum-minimum stress difference is preferably 20 MPa or more.

Accordingly, in the case of repeatedly applying stress, it is preferable to increase the difference between strong and weak stress. Note that, it is possible to vary the tensile stress that is applied to a steel sheet by, for example, appropriately adjusting the feed speed and frictional force of each roller when passing the steel sheet through a continuous annealing line, and the tensile stress can be determined based on the tensile force that is measured at a pinch roller.

In the case of performing hot-dip galvanization on the steel sheet surface, for example, the steel sheet may be passed through a continuous hot-dip galvanization line after the steel sheet has passed through the aforementioned continuous annealing line.

When performing hot-dip galvanization, limitations are not particularly set with respect to the composition and temperature of the plating bath in which the steel sheet is dipped. For example, the composition of the plating bath preferably contains Zn as a main component and has an effective Al amount (value obtained as a result of subtracting a total Fe amount from a total Al amount in the plating bath) within the range of 0.050 to 0.250 mass %.

If the effective Al amount in the plating bath is less than 0.050 mass %, there is a risk that penetration of Fe into the plating layer may proceed excessively, and the plating adhesion may decrease. On the other hand, if the effective Al amount in the plating bath is more than 0.250 mass %, there is a risk that Al-based oxides which inhibit movement of Fe atoms and Zn atoms may form at the boundary between the steel sheet and the plating layer, and the plating adhesion may decrease. The effective Al amount in the plating bath is more preferably 0.065 mass % or more, and more preferably is not more than 0.180 mass %.

Note that, the plating bath may contain one or more types of element selected from Ag, B, Be, Bi, Ca, Cd, Co, Cr, Cs, Cu, Ge, Hf, I, K, La, Li, Mg, Mn, Mo, Na, Nb, Ni, Pb, Rb, S, Si, Sn, Sr, Ta, Ti, V, W, Zr and REM.

Further, the plating bath temperature is preferably in the range of 450 to 490° C. If the plating bath temperature is less than 450° C., there is a risk that the viscosity of the plating bath may increase excessively and it may become difficult to control the thickness of the plating layer, and the appearance of the hot-dip galvanized steel sheet may be diminished. On the other hand, if the plating bath temperature is more than 490° C., there is a risk that a large amount of fumes may be generated and it may become difficult to perform safe plating operations. The plating bath temperature is more preferably 455° C. or more, and more preferably is not more than 480° C.

The steel sheet temperature when dipping the steel sheet into the plating bath is preferably within the range of 440 to 500° C. If the steel sheet temperature is less than 440° C., it may be necessary to impart a large quantity of heat to the plating bath in order to maintain the plating temperature in the range of 450 to 490° C., and the production cost may thus increase. On the other hand, if the steel sheet temperature when dipping the steel sheet into the plating bath is more than 500° C., it may be necessary to provide equipment that dissipates a large quantity of heat from the plating bath in order to maintain the plating bath temperature at a temperature that is not more than 490° C., and the production cost may thus increase. The steel sheet temperature is more preferably 450° C. or more, and more preferably is 490° C. or less.

After drawing the steel sheet up from the plating bath, it is preferable to blow high-pressure gas having nitrogen as a main component at the surface of the steel sheet to remove excessive zinc and make the coating mass of the plating an appropriate amount.

In the case of performing alloying treatment on a hot-dip galvanized layer, the steel sheet on which the hot-dip galvanized layer is formed is heated to a temperature range of 450 to 600° C. If the alloying temperature is less than 450° C., there is a risk that alloying may not proceed sufficiently. On the other hand, if the alloying temperature is more than 600° C., there is a risk that alloying may proceed too much and the Fe concentration in the plating layer may be more than 15% due to formation of a Γ phase. The alloying temperature is more preferably 470° C. or more, and more preferably is not more than 580° C.

Since it is necessary to change the alloying temperature according to the chemical composition of the steel sheet and the degree of formation of an internal oxidized layer, it suffices to set the alloying temperature while confirming the Fe concentration in the plating layer.

The steel sheet according to the present invention is a steel sheet that it is possible to apply for all kinds of welding in which LME can occur during the welding, such as spot welding, MIG welding, TIG welding, and laser welding. In particular, in a case where spot welding is applied, the liquid metal embrittlement resistance in the spot weld zone is remarkably excellent.

Hereunder, the present invention is described specifically by way of examples, although the present invention is not limited to these examples.

EXAMPLE 1

The steels having the chemical compositions shown in Table 1 were melted and slabs were cast. Thereafter, each slab that had been cooled to the temperature shown in Table 2 was reheated to 1220° C. and then subjected to hot rolling to produce hot-rolled steel sheets with a sheet thickness of 2.8 mm. Subsequently, after performing pickling, cold rolling with the rolling reductions shown in Table 2 was performed and cold-rolled steel sheets were obtained. The obtained cold-rolled steel sheets were subjected to annealing under the conditions shown in Table 2. During annealing, the maximum tensile stress and minimum tensile stress were controlled by adjusting the coefficient of friction for rotation of the rolls and the value of the average value of the tensile stress applied to the steel sheet. Note that, the maximum-minimum stress difference was measured using variations in the values at 30 second intervals.

Next, some of the steel sheets were subjected to a plating treatment under the conditions shown in Table 2 to thereby produce a hot-dip galvanized steel sheet (GI steel sheet) or a galvannealed steel sheet (GA steel sheet). The effective Al amount in the plating bath was made 0.1 mass %.

In addition, in some of the steel sheets, GI steel sheets and GA steel sheets, a nickel electroplating layer was provided on the surface of the base metal. Thus, the respective test materials were obtained.

TABLE 1

| Steel | Chemical composition (mass % balance: Fe and impurities) | | | | | | | | | |
|---|---|---|---|---|---|---|---|---|---|---|
| | C | Si | Mn | P | S | Al | N | O | Ti | Nb |
| A | 0.21 | 1.90 | 2.80 | 0.009 | 0.0035 | 0.0031 | 0.0035 | 0.0025 | — | — |
| B | 0.35 | 1.61 | 3.09 | 0.022 | 0.0112 | 0.151 | 0.0035 | 0.0025 | 0.05 | — |
| C | 0.26 | 0.13 | 1.1 | 0.006 | 0.0136 | 0.036 | 0.0023 | 0.0089 | — | 0.03 |
| D | 0.39 | 2.28 | 9.44 | 0.016 | 0.0103 | 0.049 | 0.0003 | 0.0004 | — | — |
| E | 0.34 | 0.27 | 2.63 | 0.002 | 0.0189 | 0.645 | 0.0006 | 0.0052 | — | — |
| F | 0.30 | 0.78 | 2.72 | 0.021 | 0.0056 | 2.286 | 0.0069 | 0.0008 | — | — |
| G | 0.37 | 1.37 | 1.84 | 0.004 | 0.0066 | 0.215 | 0.0017 | 0.0004 | — | — |
| H | 0.20 | 1.94 | 2.31 | 0.025 | 0.0093 | 0.368 | 0.0034 | 0.0059 | — | — |
| I | 0.33 | 0.61 | 1.59 | 0.013 | 0.0014 | 0.0053 | 0.0008 | 0.0026 | — | — |
| J | 0.18 | 1.64 | 2.47 | 0.028 | 0.0086 | 0.255 | 0.0084 | 0.0090 | — | — |
| K | 0.38 | 0.94 | 5.91 | 0.017 | 0.0096 | 0.004 | 0.0052 | 0.0041 | — | — |
| L | 0.23 | 2.44 | 2.32 | 0.019 | 0.0076 | 1.572 | 0.0057 | 0.0070 | — | — |
| M | 0.18 | 1.40 | 2.00 | 0.010 | 0.0030 | 0.022 | 0.0006 | 0.0094 | — | — |
| N | 0.32 | 2.70 | 2.10 | 0.008 | 0.0057 | 0.034 | 0.0052 | 0.0021 | — | — |
| O | 0.15 | 2.41 | 5.73 | 0.028 | 0.0019 | 0.321 | 0.0089 | 0.0063 | — | — |
| P | 0.42 | 2.20 | 1.43 | 0.026 | 0.0161 | 1.434 | 0.0019 | 0.0004 | — | — |
| Q | 0.27 | 0.08 | 4.88 | 0.013 | 0.0058 | 0.306 | 0.0035 | 0.0054 | — | — |
| R | 0.27 | 1.00 | 0.86 | 0.021 | 0.0096 | 2.107 | 0.014 | 0.0014 | — | — |
| S | 0.25 | 1.58 | 10.37 | 0.003 | 0.0141 | 2.245 | 0.0046 | 0.0047 | — | — |
| T | 0.25 | 2.36 | 6.52 | 0.032 | 0.0045 | 2.229 | 0.0086 | 0.0029 | — | — |
| U | 0.34 | 2.27 | 5.45 | 0.028 | 0.0216 | 0.059 | 0.0039 | 0.0030 | — | — |
| V | 0.26 | 1.03 | 4.54 | 0.008 | 0.0050 | 2.544 | 0.0077 | 0.0064 | — | — |
| W | 0.27 | 0.98 | 4.01 | 0.007 | 0.0144 | 0.678 | 0.0125 | 0.0002 | — | — |
| X | 0.40 | 2.21 | 5.80 | 0.012 | 0.0043 | 1.130 | 0.0358 | 0.0117 | — | — |

| Steel | Chemical composition (mass % balance: Fe and impurities) | | | | | | | | |
|---|---|---|---|---|---|---|---|---|---|
| | V | B | Cr | Ni | Cu | Mo | Ca | Mg | REM |
| A | — | — | — | — | — | — | — | — | — |
| B | — | — | — | — | — | — | — | — | — |
| C | 0.07 | — | — | — | — | — | — | — | — |
| D | — | — | — | — | — | — | — | — | — |
| E | — | 0.003 | — | — | — | — | — | — | — |
| F | — | — | 0.62 | — | — | — | — | — | — |
| G | — | — | — | 0.44 | — | — | — | — | — |
| H | — | — | — | — | 0.09 | — | — | — | — |
| I | — | — | — | — | — | 0.41 | — | — | — |
| J | — | — | — | — | — | — | 0.02 | — | — |
| K | — | — | — | — | — | — | — | 0.01 | — |
| L | — | — | — | — | — | — | — | — | 0.04 |

TABLE 1-continued

| | | | | | | | | |
|---|---|---|---|---|---|---|---|---|
| M | — | — | 0.02 | — | — | 0.05 | — | — | — |
| N | — | — | — | — | — | — | — | — | — |
| O | — | — | — | — | — | — | — | — | — |
| P | — | — | — | — | — | — | — | — | — |
| Q | — | — | — | — | — | — | — | — | — |
| R | — | — | — | — | — | — | — | — | — |
| S | — | — | — | — | — | — | — | — | — |
| T | — | — | — | — | — | — | — | — | — |
| U | — | — | — | — | — | — | — | — | — |
| V | — | — | — | — | — | — | — | — | — |
| W | — | — | — | — | — | — | — | — | — |
| X | — | — | — | — | — | — | — | — | — |

TABLE 2

| Test No. | Steel | Cooling temperature after casting (° C.) | Cold rolling reduction % | Annealing condition | | | | | | Plating condition | | |
|---|---|---|---|---|---|---|---|---|---|---|---|---|
| | | | | Highest annealing temperature (° C.) | Dew point (° C.) | H$_2$ concentration (%) | Maximum tensile stress (MPa) | Minimum tensile stress (MPa) | maximum-minimum stress difference | Bath temperature (° C.) | Dipped steel sheet temperature (° C.) | Alloying temperature (° C.) |
| 1 | A | 28 | 62 | 852 | −16 | 12.6 | 40 | 38 | 2 | — | — | — |
| 2 | A | 953 | 43 | 775 | 12 | 25.1 | 7 | 3 | 4 | — | — | — |
| 3 | A | 939 | 61 | 779 | −6 | 10.5 | 43 | 4 | 39 | — | — | — |
| 4 | A | 849 | 58 | 887 | −19 | 19.6 | 56 | 8 | 48 | 463 | 465 | — |
| 5 | A | 984 | 54 | 775 | 8 | 27.7 | 33 | 39 | 6 | 460 | 465 | 562 |
| 6 | A | 965 | 30 | 745 | −39 | 4.7 | 29 | 29 | 0 | — | — | — |
| 7 | A | 932 | 32 | 839 | −42 | 4.3 | 7 | 6 | 1 | — | — | — |
| 8 | A | 901 | 65 | 778 | 22 | 1.2 | 28 | 28 | 0 | 465 | 468 | — |
| 9 | A | 969 | 68 | 818 | −48 | 9.7 | 31 | 19 | 12 | 467 | 469 | 481 |
| 10 | A | 877 | 30 | 821 | −13 | 2.6 | — | — | 0 | — | — | — |
| 11 | B | 981 | 51 | 837 | −37 | 1.1 | 15 | 8 | 7 | — | — | — |
| 12 | C | 827 | 13 | 777 | 3 | 16.0 | 28 | 5 | 21 | — | — | — |
| 13 | D | 913 | 56 | 841 | −12 | 6.1 | 44 | 31 | 13 | — | — | — |
| 14 | E | 352 | 86 | 865 | 17 | 8.5 | 79 | 76 | 3 | — | — | — |
| 15 | F | 879 | 60 | 848 | 18 | 4.1 | 126 | 4 | 122 | — | — | — |
| 16 | G | 929 | 35 | 823 | −8 | 13.2 | 50 | 5 | 45 | — | — | — |
| 17 | H | 471 | 50 | 788 | 10 | 25.8 | 13 | 30 | 3 | — | — | — |
| 18 | I | 852 | 41 | 809 | −17 | 8.4 | 15 | 5 | 10 | — | — | — |
| 19 | J | 814 | 31 | 786 | 9 | 3.8 | 56 | 5 | 51 | — | — | — |
| 20 | K | 809 | 35 | 899 | 2 | 11.8 | 59 | 6 | 53 | — | — | — |
| 21 | L | 854 | 40 | 873 | 5 | 6.9 | 53 | 6 | 47 | — | — | — |
| 22 | M | 833 | 31 | 879 | 19 | 3.1 | 26 | 19 | 7 | — | — | — |
| 23 | M | 839 | 55 | 872 | 6 | 3.1 | 13 | 8 | 5 | 467 | 469 | — |
| 24 | M | 965 | 20 | 787 | 1 | 5.4 | 52 | 47 | 5 | 468 | 466 | 475 |
| 25 | M | 807 | 20 | 777 | 27 | 4.8 | 25 | 19 | 6 | — | — | — |
| 26 | M | 927 | 37 | 792 | −45 | 5.3 | 12 | 8 | 4 | 470 | 480 | — |
| 27 | M | 951 | 90 | 750 | −51 | 8.1 | 51 | 43 | 8 | 465 | 490 | 570 |
| 28 | M | 810 | 30 | 826 | −29 | 32.0 | 18 | 11 | 7 | — | — | — |
| 29 | M | 984 | 28 | 870 | 5 | 0.0 | 28 | 24 | 4 | 465 | 464 | — |
| 30 | M | 970 | 27 | 810 | −17 | 36.0 | 46 | 41 | 5 | 458 | 464 | 480 |
| 31 | N | 906 | 28 | 892 | −4 | 3.6 | 33 | 25 | 8 | — | — | — |
| 32 | N | 961 | 45 | 850 | 15 | 25.6 | 15 | 2 | 13 | 463 | 460 | — |
| 33 | N | 897 | 64 | 807 | 9 | 6.8 | 16 | 13 | 3 | 465 | 463 | 499 |
| 34 | N | 886 | 52 | 862 | −47 | 3.4 | 51 | 47 | 4 | — | — | — |
| 35 | N | 913 | 68 | 872 | −43 | 14.5 | 16 | 11 | 5 | 460 | 467 | — |
| 36 | N | 882 | 47 | 807 | −31 | 37.0 | 54 | 45 | 9 | 468 | 467 | 582 |
| 37 | O | 819 | 68 | 753 | −24 | 1.3 | 29 | 22 | 7 | — | — | — |
| 38 | P | 814 | 47 | 890 | −16 | 11.6 | 24 | 4 | 20 | — | — | — |
| 39 | Q | 903 | 36 | 982 | 16 | 1.1 | 8 | 3 | 5 | — | — | — |
| 40 | R | 876 | 63 | 850 | 2 | 2.5 | 43 | 33 | 10 | — | — | — |
| 41 | S | 811 | 31 | 814 | −22 | 7.3 | 27 | 7 | 20 | — | — | — |
| 42 | T | 882 | 29 | 897 | −19 | 9.5 | 14 | 10 | 4 | — | — | — |
| 43 | U | 950 | 31 | 822 | −11 | 2.1 | 39 | 8 | 31 | — | — | — |
| 44 | V | 813 | 64 | 859 | −19 | 8.6 | 21 | 11 | 10 | — | — | — |
| 45 | W | 953 | 50 | 824 | −38 | 7.1 | 44 | 10 | 34 | — | — | — |
| 46 | X | 842 | 45 | 899 | −21 | 4.1 | 55 | 4 | 51 | — | — | — |

Thereafter, a test specimen for micro-structure observation was taken from each test material so as to enable observation of the micro-structure at a sheet-thickness cross section. Subsequently, in each obtained test specimen, a face that was parallel to the rolling direction and perpendicular to the sheet thickness direction was subjected to wet polishing using emery paper, and was further subjected to buff polishing using diamond abrasive grains having an average diameter of 1 μm to thereby finish the observation surface to be a mirror-like surface.

In addition, in order to remove strain that was introduced into the polished surface by the aforementioned mechanical polishing, colloidal silica polishing was performed using a suspension in which alcohol was adopted as a solvent. For the polishing using colloidal silica, automatic polishing was performed using VibroMet 2 manufactured by Buehler for one hour with an output setting of 40%.

The outer layer of each test specimen that was adjusted by the procedure described above was observed by SEM and SEM-EBSD. The SEM used for measurement was an SEM with the model name JSM-7001F that was manufactured by JEOL Ltd. Among observation magnifications within the range of 1000 to 9000 times, a magnification at which the number of ferrite grains included in the micro-structure was 10 or more was selected. Thereafter, the oxides that were present at grain boundaries were confirmed in a backscattered electron image obtained by SEM. The micro-structure of the outer layer of the steel sheet in five visual fields was then imaged, and the state regarding the presence of internal oxides was ascertained.

Subsequently, crystal orientation data for bcc iron was acquired by SEM-EBSD at the same positions as the visual fields observed by means of the aforementioned SEM-backscattered electron image. Measurement by EBSD was performed using an EBSD detector attached to the SEM, and the magnification for the measurement was made the same magnification as for observation of the SEM-backscattered electron image. The measurement step for the test specimens was set to 0.05 µm. At such time, in the present invention, software named "OIM Data Collection (TM) (ver. 7)" made by TSL Solutions Ltd. and the like was used as the software for acquiring the crystal orientation data.

In the crystal orientation map data for bcc iron obtained under the aforementioned measurement conditions, boundaries at which the crystal orientation difference was 15° or more were taken as crystal grain boundaries, except for regions for which the confidence index value (CI value) was less than 0.1. At such time, in the present invention, software named "OIM Analysis™ (ver. 7)" made by TSL Solutions Ltd. and the like was used as the data analysis software for analyzing the crystal orientations.

Note that, since crystal orientation data for bcc iron is not obtained in a case where oxides are present at grain boundaries of ferrite, there may be many regions for which the CI value is less than 0.1 between adjacent grains. In this case, although a crystal grain boundary could not be distinctly confirmed, at a boundary at which the orientation difference with an adjacent ferrite grain was 15° or more, a crystal grain boundary was plotted on the map so as to pass through the center of the regions for which the CI value was less than 0.1.

The grain boundary coverage ratio (%) for the ferrite grain boundary map obtained by the above procedure was calculated by dividing the oxide covered length by the length of all of the crystal grain boundaries.

Next, using the aforementioned test specimens, measurement of the depth to which a decarburization layer was present was conducted. Specifically, measurement of the Vickers hardness was performed to a position at a depth of 300 µm in steps of 20 µm in the depth direction from the base metal surface of each test specimen, and also in a region from 2/5 to 3/5 of the sheet thickness of the test material. The test force at such time was 10 gf. A region of the outer layer in which the hardness decreased to 80% or less relative to the average hardness in the region from 2/5 to 3/5 of the sheet thickness was taken to be a decarburization layer.

Next, measurement of the coating mass (g/m$^2$) and Fe concentration (mass %) of the plating layer was performed with respect to the test materials which had a plating layer on the surface of the base metal. Further, measurement of the coating mass (g/m$^2$) of the nickel electroplating layer was performed with respect to the test materials which had a nickel electroplating layer on the surface of the base metal. Measurement of the Fe concentration (mass %) of the plating layer was performed using an electron probe microanalyzer (EPMA). The machine used for the measurement was a machine with the model name JXA-8500F manufactured by JEOL Ltd.

In addition, a JIS No. 5 tensile test specimen was taken from a direction (width direction) orthogonal to the rolling direction and thickness direction of each test material, and a tensile test was performed in accordance with JIS Z 2241, and the tensile strength (TS) was measured.

Evaluation of the liquid metal embrittlement resistance was then performed by the procedure described hereunder using each test material.

Figure 4:
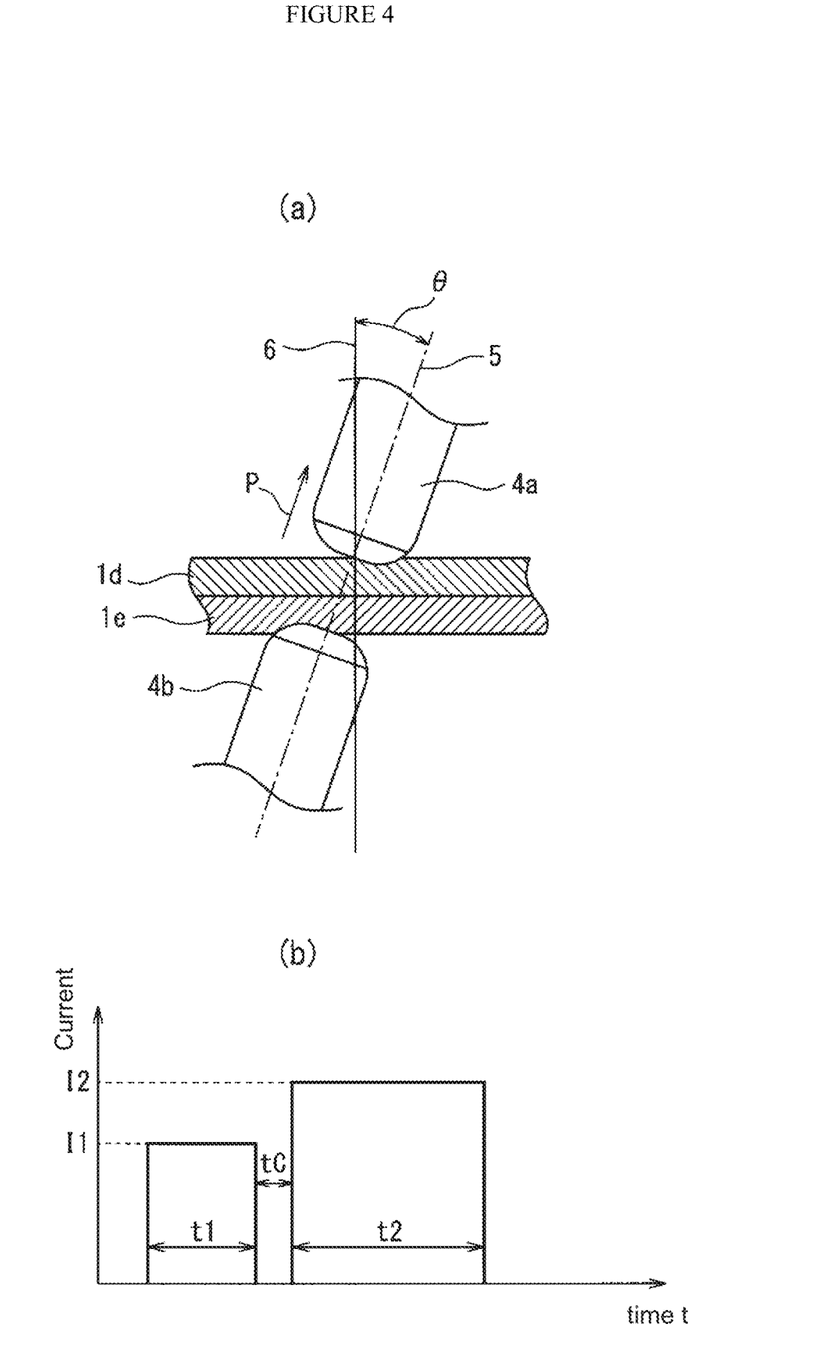
FIG. 4 is a view illustrating the manner of performing of a test for evaluating liquid metal embrittlement resistance. In the figure, (a) illustrates the manner in which two steel sheets are spot welded, and (b) illustrates the manner in which current control is performed when spot welding two steel sheets.

FIG. 4 illustrates the manner in which the test for evaluating the liquid metal embrittlement resistance was performed. FIG. 4(a) illustrates the manner in which two steel sheets were spot welded, and FIG. 4(b) illustrates the manner in which current control was performed when spot welding the two steel sheets. A steel sheet 1$d$ and a steel sheet 1$e$ were placed on top of each other, and were spot welded using a pair of electrodes 4$a$ and 4$b$. The welding conditions were as follows.

Electrodes 4$a$, 4$b$: DR-type electrodes made of Cr—Cu, tip diameter: 8 mm, R: 40 mm
Welding pressure P: 450 kg
Inclination angle of electrode (angle formed by electrode center line 5 and perpendicular line 6) θ: 3°
Upslope: none
First weld time t1: 0.2 secs
Non-welding interval tc: 0.04 secs
Second weld time t2: 0.4 secs
Current ratio I1/I2: 0.7
Holding time after end of welding: 0.1 secs Note that, a galvannealed steel sheet shown in Test No. 24 in Table 2 was always used for the steel sheet 1$d$ illustrated in FIG. 4, and spot welding was performed by placing two steel sheets on top of each other with the steel sheet that was the evaluation object on the 1$e$ side, and the state of occurrence of LME in the steel sheet on the 1$e$ side was evaluated by cross-sectional observation.

Here, as illustrated in Table 2 and Table 3, for the specimens of Test Nos. 1 to 3, 6, 7, 10 to 22, 25, 28, 31, 34, and 37 to 46, the test was performed using a cold-rolled steel sheet on which plating had not been performed on one part of the steel sheet on the 1$e$ side. Even in this case, since the surface of the steel sheet on the 1$e$ side contacts the surface subjected to galvanization of the steel sheet 1$d$, the liquid metal embrittlement resistance can be evaluated even in the case of a cold-rolled steel sheet with respect to which the surface of the steel sheet on the 1$e$ side was not subjected to galvanization.

The state of LME was evaluated by polishing a cross-section of the steel sheet that included the center of the nugget, performing SEM observation by a similar technique as described above, and evaluating cracks at three locations, namely an inner crack 3$a$ between the steel sheets, an outer crack 3$b$ at a contact portion between the steel sheet and the spot welding electrode, and an outer crack 3$c$ at a steel sheet portion that did not directly contact the electrode, based on the following crack ratings.

1: There are no cracks at any of the locations.
2: There is a crack at any one location, and the length of the crack is not more than 60 µm.
3: Cracks are observed at two locations or three locations, and the length of each crack is not more than 60 µm.
4: There is a crack with a length of more than 60 µm at any one or more of the locations.

The results are shown in Table 3.

TABLE 3

| Test No. | Steel | Type of steel sheet | Internal oxidized layer Depth to be present (μm) | Grain boundary coverage ratio (%) | decarbonization layer Depth to be present (μm) | Plating layer Coating mass (g/m³) | Fe concentration (%) | Coating mass of Ni electro-plating layer (g/m³) | TS (MPa) | Crack rating | |
|---|---|---|---|---|---|---|---|---|---|---|---|
| 1 | A | Cold-rolled | 7 | 63 | 69 | — | — | — | 1193 | 3 | Inventive |
| 2 | A | Cold-rolled | 7 | 71 | 62 | — | — | — | 1151 | 2 | example |
| 3 | A | Cold-rolled | 11 | 87 | 116 | — | — | — | 1185 | 1 | |
| 4 | A | GI | 14 | 92 | 79 | 43 | 0.2 | — | 1197 | 1 | |
| 5 | A | GA | 9 | 75 | 84 | 98 | 9 | — | 1210 | 2 | |
| 6 | A | Cold-rolled | 9 | 51 | 53 | — | — | — | 1176 | 4 | Comparative |
| 7 | A | Cold-rolled | 4 | 58 | 71 | — | — | — | 1205 | 4 | example |
| 8 | A | GI | 6 | 50 | 159 | 61 | 0.1 | — | 987 | 4 | |
| 9 | A | GA | 2 | 47 | 101 | 55 | 11 | — | 1215 | 4 | |
| 10 | A | Cold-rolled | 12 | 54 | 73 | — | — | — | 1129 | 4 | |
| 11 | B | Cold-rolled | 13 | 74 | 32 | — | — | — | 1668 | 2 | Inventive |
| 12 | C | Cold-rolled | 14 | 90 | 36 | — | — | — | 1265 | 1 | example |
| 13 | D | Cold-rolled | 14 | 79 | 87 | — | — | — | 1800 | 2 | |
| 14 | E | Cold-rolled | 13 | 68 | 87 | — | — | — | 1710 | 3 | |
| 15 | F | Cold-rolled | 11 | 82 | 57 | — | — | — | 1354 | 1 | |
| 16 | G | Cold-rolled | 15 | 87 | 113 | — | — | — | 1677 | 1 | |
| 17 | H | Cold-rolled | 13 | 69 | 55 | — | — | — | 1274 | 3 | |
| 18 | I | Cold-rolled | 10 | 75 | 136 | — | — | — | 1384 | 2 | |
| 19 | J | Cold-rolled | 8 | 87 | 91 | — | — | — | 1098 | 1 | |
| 20 | K | Cold-rolled | 8 | 98 | 75 | — | — | — | 1597 | 1 | |
| 21 | L | Cold-rolled | 6 | 92 | 69 | — | — | — | 1249 | 1 | |
| 22 | M | Cold-rolled | 12 | 71 | 95 | — | — | — | 992 | 2 | |
| 23 | M | GI | 6 | 75 | 99 | 77 | 0.3 | 1 | 994 | 2 | |
| 24 | M | GA | 6 | 73 | 70 | 65 | 9.0 | 3 | 995 | 2 | |
| 25 | M | Cold-rolled | 15 | 58 | 168 | — | — | — | 984 | 4 | |
| 26 | M | GI | 3 | 57 | 86 | 55 | 0.1 | 1 | 1033 | 4 | Comparative |
| 27 | M | GA | 1 | 48 | 80 | 56 | 9.0 | — | 1021 | 4 | example |
| 28 | M | Cold-rolled | 1 | 62 | 65 | — | — | — | 1035 | 4 | |
| 29 | M | GI | 6 | 37 | 36 | 42 | 0.1 | — | 1020 | 4 | |
| 30 | M | GA | 1 | 65 | 87 | 70 | 14.0 | — | 1022 | 4 | |
| 31 | N | Cold-rolled | 10 | 61 | 85 | — | — | 1 | 1497 | 4 | |
| 32 | N | GI | 11 | 64 | 106 | 75 | 0.1 | 3 | 1477 | 4 | |
| 33 | N | GA | 14 | 86 | 82 | 38 | 1.0 | 2 | 1511 | 4 | |
| 34 | N | Cold-rolled | 2 | 43 | 151 | — | — | — | 983 | 4 | |
| 35 | N | GI | 1 | 50 | 112 | 44 | 0.1 | — | 1533 | 4 | |
| 36 | N | GA | 0 | 64 | 115 | 45 | 11.0 | — | 1541 | 4 | |
| 37 | O | Cold-rolled | 7 | 75 | 89 | — | — | — | 895 | 2 | |
| 38 | P | Cold-rolled | 14 | 74 | 109 | — | — | — | 2033 | 4 | |
| 39 | Q | Cold-rolled | 13 | 8 | 73 | — | — | — | 1251 | 4 | |
| 40 | R | Cold-rolled | 7 | 12 | 111 | — | — | — | 1264 | 4 | |
| 41 | S | Cold-rolled | 11 | 61 | 103 | — | — | — | 1398 | 4 | |
| 42 | T | Cold-rolled | 13 | 71 | 88 | — | — | — | 1216 | 4 | |
| 43 | U | Cold-rolled | 15 | 87 | 115 | — | — | — | 1575 | 4 | |
| 44 | V | Cold-rolled | 12 | 86 | 80 | — | — | — | 1208 | 4 | |
| 45 | W | Cold-rolled | 14 | 62 | 85 | — | — | — | 1361 | 4 | |
| 46 | X | Cold-rolled | 13 | 98 | 78 | — | — | — | 1554 | 4 | |

As will be understood from Table 3, since Test Nos. 1 to 5 and 11 to 24 satisfied all of the conditions defined in the present invention, the respective crack ratings were in the range of 1 to 3, thus exhibiting favorable liquid metal embrittlement resistance. Note that, for Test Nos. 1, 14 and 17, after casting, since the slab was cooled once to a temperature of 500° C. or less and thereafter reheating was performed, the crack rating was 3, and the result for liquid metal embrittlement resistance was inferior in comparison to other Inventive Examples of the present invention.

On the other hand, in Test Nos. 6 to 10 and 25 to 30, at least one condition regarding the depth to which the internal oxidized layer was present and the grain boundary coverage ratio deviated from the defined conditions, which was attributed to the fact that the annealing conditions were not appropriate, and therefore the crack rating was 4, indicating that the liquid metal embrittlement resistance was poor. Note that, in Test No. 9, although the applied maximum-minimum stress difference was 2 MPa or more, the dew point during annealing was noticeably low and the grain boundary coverage ratio decreased. Thus, when the composition and annealing conditions and the like deviated from the ranges defined in the present invention, even when the maximum-minimum stress difference was large, there was a case where the grain boundary coverage ratio decreased. Further, with respect to Test No. 10, since tensile stress was not applied during annealing, the grain boundary coverage ratio decreased.

In Test Nos. 31 to 36 and 38 to 46, because the chemical composition deviated from the chemical composition, irrespective of the production conditions, the crack rating was 4 and the liquid metal embrittlement resistance was poor. Further, with respect to Test No. 37, because the content of C was less than the lower limit value, even though the liquid metal embrittlement resistance was good, the result was that the strength decreased.

Note that, in Test Nos. 33 and 44, although the maximum-minimum stress difference was small, the grain boundary coverage ratio was high. It is considered that the reason was that, in Test Nos. 33 and 44, because the content of Si or Al was higher than the range defined in the present invention, a large amount of oxides formed. However, because the aforementioned compositions deviated from the range defined in the present invention, the liquid metal embrittlement resistance was poor.

EXAMPLE 2

Next, to investigate the influence of the rating on the characteristics, welding was performed in a similar manner to Example 1 using the three test materials of Test Nos. 2, 4 and 24. The welding conditions were as follows.

Electrodes 4a, 4b: DR-type electrodes made of Cr—Cu, tip diameter: 8 mm, R: 40 mm
Welding pressure P: 450 kg
Inclination angle of electrode (angle formed by electrode center line 5 and perpendicular line 6) θ: 1 to 10°
Upslope: none
First weld time t1: 0.2 secs
Non-welding interval tc: 0.04 secs
Second weld time t2: 0.4 secs
Current ratio I1/I2: 0.7
Holding time after end of welding: 0.1 secs Note that, similarly to Example 1, a galvannealed steel sheet shown in Test No. 24 was always used for the steel sheet 1d illustrated in FIG. 4, and spot welding was performed by placing two steel sheets on top of each other with the steel sheet that was the evaluation object on the 1e side, and the state of occurrence of LME in the steel sheet on the 1e side was evaluated by cross-sectional observation. Further, the lengths of cracks after welding were adjusted by varying the inclination angle of the electrode in the range of 3 to 10°. Since the residual stress that arose in the outer layer of the steel sheet during welding increased as the inclination angle increased, LME cracking was more liable to occur as the inclination angle increased.

The cross tension strength (CTS) was evaluated using the steel sheets after welding. The results are shown in Table 4.

TABLE 4

| Test No. | θ (°) | Crack rating | Relative CTS value |
|---|---|---|---|
| 2 | 1 | 1 | 1 |
|  | 3 | 2 | 0.95 |
|  | 5 | 2 | 0.92 |
|  | 7 | 3 | 0.9 |
|  | 10 | 4 | 0.56 |
| 4 | 1 | 1 | 1 |
|  | 3 | 1 | 0.99 |
|  | 5 | 1 | 0.96 |
|  | 7 | 2 | 0.94 |
|  | 10 | 3 | 0.91 |
| 24 | 1 | 1 | 1 |
|  | 3 | 2 | 0.94 |
|  | 5 | 2 | 0.91 |
|  | 7 | 3 | 0.92 |
|  | 10 | 4 | 0.55 |

Relative CTS value $CTS_{\theta=x}/CTS_{\theta=1°}$

As will be understood from the results in Table 4, within the range of ratings of 1 to 3, a relative CTS value with respect to the CTS value in a case where welding was performed when an inclination angle θ of the electrodes was 1° was 0.9 or more. In contrast, in a case where the rating was 4, it was found that the relative CTS value was less than 0.6, and the characteristics noticeably deteriorated.

INDUSTRIAL APPLICABILITY

According to the present invention, a steel sheet, a hot-dip galvanized steel sheet and a galvannealed steel sheet that are excellent in liquid metal embrittlement resistance can be obtained.

The invention claimed is:

1. A steel sheet in which a chemical composition of a base metal comprises, in mass %,
   C: 0.17 to 0.40%,
   Si: 0.10 to 2.50%,
   Mn: 1.00 to 10.00%,
   P: 0.001 to 0.03%,
   S: 0.0001 to 0.02%,
   Al: 0.001 to 2.50%,
   N: 0.0001 to 0.010%,
   O: 0.0001 to 0.010%,
   Ti: 0 to 0.10%,
   Nb: 0 to 0.10%,
   V: 0 to 0.10%,
   B: 0 to 0.010%,
   Cr: 0 to 2.00%,
   Ni: 0 to 2.00%,
   Cu: 0 to 2.00%,
   Mo: 0 to 2.00%,
   Ca: 0 to 0.50%,
   Mg: 0 to 0.50%,
   REM: 0 to 0.50%, and
   the balance: Fe and impurities,
   wherein the steel sheet has, from a surface of the base metal to a depth of 5.0 μm or more, an internal oxidized layer in which at least one part of a crystal grain boundary is covered with oxides, and wherein:
   in a region from the surface of the base metal to a depth of 5.0 μm, a grain boundary coverage ratio of the oxides is 60% or more.

2. The steel sheet according to claim 1, comprising:
   a decarburization layer from the surface of the base metal to a depth of 50 μm or more.

3. A hot-dip galvanized steel sheet, comprising:
   a hot-dip galvanized layer on a surface of the steel sheet according to claim 2.

4. The hot-dip galvanized steel sheet according to claim 3, wherein:
   a coating mass of the hot-dip galvanized layer is not more than 70 g/m².

5. A galvannealed steel sheet, comprising:
   a galvannealed layer on a surface of the steel sheet according to claim 2.

6. The galvannealed steel sheet according to claim 5, wherein:
   a coating mass of the galvannealed layer is not more than 70 g/m².

7. The galvannealed steel sheet according to claim 5, wherein:
   the galvannealed layer contains, in mass %, Fe: 7.0 to 15.0%.

8. The steel sheet according to claim 1, comprising:
   a nickel electroplating layer on the surface of the base metal.

9. A hot-dip galvanized steel sheet, comprising:
a hot-dip galvanized layer on a surface of the steel sheet according to claim 8.

10. The hot-dip galvanized steel sheet according to claim 9, wherein:
a coating mass of the hot-dip galvanized layer is not more than 70 g/m$^2$.

11. A galvannealed steel sheet, comprising:
a galvannealed layer on a surface of the steel sheet according to claim 8.

12. The galvannealed steel sheet according to claim 11, wherein:
a coating mass of the galvannealed layer is not more than 70 g/m$^2$.

13. The galvannealed steel sheet according to claim 11, wherein:
the galvannealed layer contains, in mass %, Fe: 7.0 to 15.0%.

14. The steel sheet according to claim 1, wherein the steel sheet has a tensile strength of 980 MPa or more.

15. A hot-dip galvanized steel sheet, comprising:
a hot-dip galvanized layer on a surface of the steel sheet according to claim 1.

16. The hot-dip galvanized steel sheet according to claim 15, wherein:
a coating mass of the hot-dip galvanized layer is not more than 70 g/m$^2$.

17. A galvannealed steel sheet, comprising:
a galvannealed layer on a surface of the steel sheet according to claim 1.

18. The galvannealed steel sheet according to claim 17, wherein:
a coating mass of the galvannealed layer is not more than 70 g/m$^2$.

19. The galvannealed steel sheet according to claim 17, wherein:
the galvannealed layer contains, in mass %, Fe: 7.0 to 15.0%.

* * * * *